(12) United States Patent
Bhave et al.

(10) Patent No.: US 11,811,035 B2
(45) Date of Patent: Nov. 7, 2023

(54) RECOVERY OF CRITICAL ELEMENTS FROM END-OF-LIFE LITHIUM ION BATTERIES WITH SUPPORTED MEMBRANE SOLVENT EXTRACTION

(71) Applicant: UT-Battelle, LLC, Oak Ridge, TN (US)

(72) Inventors: Ramesh R. Bhave, Knoxville, TN (US); Syed Z. Islam, Knoxville, TN (US); Priyesh A. Wagh, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 631 days.

(21) Appl. No.: 16/884,189

(22) Filed: May 27, 2020

(65) Prior Publication Data

US 2021/0376400 A1  Dec. 2, 2021

(51) Int. Cl.
*H01M 10/54* (2006.01)
*C22B 26/12* (2006.01)
(Continued)

(52) U.S. Cl.
CPC ......... *H01M 10/54* (2013.01); *B01D 11/0415* (2013.01); *B01D 11/0488* (2013.01);
(Continued)

(58) Field of Classification Search
CPC .. H01M 10/54; H01M 4/525; H01M 10/0525; B01D 11/0415; B01D 11/0488;
(Continued)

(56) References Cited

U.S. PATENT DOCUMENTS 4,437,994 A   3/1984   Baker
6,514,311 B1  2/2003   Lin et al.
(Continued)

FOREIGN PATENT DOCUMENTS

CN   109207727 A   1/2019

OTHER PUBLICATIONS

Swain et al. (Separation of Co(II) and Li(I) with Cyanex 272 using hollow fiber supported liquid membrane: A comparison with flat sheet supported liquid membrane and dispersive solvent extraction process, Chemical Engineering Journal, 2015) (Year: 2015).*
(Continued)

*Primary Examiner* — Colin W. Slifka
*Assistant Examiner* — Logan Edward Laclair
(74) *Attorney, Agent, or Firm* — WARNER NORCROSS + JUDD LLP

(57) ABSTRACT

Single-stage and multi-stage systems and methods for the recovery of critical elements in substantially pure form from lithium ion batteries are provided. The systems and methods include supported membrane solvent extraction using an immobilized organic phase within the pores of permeable hollow fibers. The permeable hollow fibers are contacted by a feed solution on one side, and a strip solution on another side, to provide the simultaneous extraction and stripping of elements from dissolved lithium ion cathode materials, while rejecting other elements from the feed solution. The single- and multi-stage systems and methods can selectively recover cobalt, manganese, nickel, lithium, aluminum and other elements from spent battery cathodes and are not limited by equilibrium constraints as compared to traditional solvent extraction processes.

16 Claims, 17 Drawing Sheets

(51) Int. Cl.
| | |
|---|---|
| *C22B 3/00* | (2006.01) |
| *H01M 10/0525* | (2010.01) |
| *B01D 61/38* | (2006.01) |
| *H01M 4/525* | (2010.01) |
| *B01D 63/02* | (2006.01) |
| *B01D 11/04* | (2006.01) |
| *C22B 23/00* | (2006.01) |

(52) U.S. Cl.
CPC .......... *B01D 11/0492* (2013.01); *B01D 61/38* (2013.01); *B01D 63/02* (2013.01); *C22B 23/00* (2013.01); *C22B 23/0484* (2013.01); *C22B 26/12* (2013.01); *H01M 4/525* (2013.01); *H01M 10/0525* (2013.01); *B01D 2311/18* (2013.01); *Y02P 10/20* (2015.11); *Y02W 30/84* (2015.05)

(58) Field of Classification Search
CPC .... B01D 11/0492; B01D 61/38; B01D 63/02; B01D 2311/18; B01D 9/0054; B01D 11/0284; B01D 11/0288; B01D 2311/13; C22B 23/00; C22B 23/0484; C22B 26/12; C22B 3/08; C22B 3/30; C22B 3/385; C22B 3/3842; C22B 23/0453; C22B 1/02; C22B 23/043; Y02E 60/10; Y02P 10/20; Y02W 30/84

See application file for complete search history.

(56) References Cited

U.S. PATENT DOCUMENTS

| | | |
|---|---|---|
| 9,968,887 B2 | 5/2018 | Bhave et al. |
| 10,246,343 B2 | 2/2019 | Chow et al. |
| 11,508,999 B2 * | 11/2022 | Morin ...................... C22B 3/26 |

OTHER PUBLICATIONS

Written Opinion for Application No. PCT/US/21/27380, dated Sep. 24, 2021, 6 pages.

Li, Ling, "Lithium Recovery from Aqueous Resources and Batteries: A Brief Review", Johnson Matthey Technol. Rev, 2018, pp. 161-176, vol. 62 (2).

International Search Report for Application No. PCT/US/21/27380, dated Sep. 24, 2021, 5 pages.

Swain, Basudev, et al. "Separation of Co (II) and Li (I) with Cyanex 272 using hollow fiber supported liquid membrane: A comparison with flat sheet supported liquid membrane and dispersive solvent extraction process." Chemical Engineering Journal 271 (2015): 61-70.

* cited by examiner

RECOVERY OF CRITICAL ELEMENTS FROM END-OF-LIFE LITHIUM ION BATTERIES WITH SUPPORTED MEMBRANE SOLVENT EXTRACTION

This invention was made with government support under Contract No. DE-AC05-00OR22725 awarded by the U.S. Department of Energy. The government has certain rights in the invention.

FIELD OF THE INVENTION

The present invention relates to the recovery of critical elements in their pure form from end-of-life lithium ion batteries, and in particular, the recovery and separation of cobalt, nickel, manganese, lithium and/or other elements using supported membrane solvent extraction.

BACKGROUND OF THE INVENTION

In recent years, lithium ion batteries have drawn significant attention worldwide due to their widespread use in portable electronics and electric vehicles. Lithium ion batteries are smaller, lighter, have no memory effect, and provide more energy per unit volume than conventional nickel-cadmium (Ni—Cd) or nickel-metal hydride (NiMH) batteries.

Cobalt is deemed a critical material and is substantially and increasingly used in lithium ion batteries. Currently, the terrestrial cobalt resources in the world are estimated at approximately 25 million tons. The richest sources of cobalt are primarily in the Democratic Republic of Congo. Cobalt mining is practiced in Congo, which currently supplies 54% of the global cobalt demand, while China, Russia, and Australia each contribute approximately 5% of the global cobalt demand. 30% of the current cobalt supply is consumed by the lithium ion battery industry. Hence, lithium ion batteries are considered an important secondary resource for the extraction and recovery of cobalt. Further, the presence of metallic contaminations in the waste generated from spent lithium ion batteries can adversely affect the environment.

Conventional solvent extraction methods have been employed commercially to recover cobalt from primary, secondary, and end-of-life battery cathode materials. However, conventional processes have limitations such as high solvent inventory, emulsion formation, and multi-step operations including stripping and scrubbing. Non-dispersive solvent extraction methods using supported liquid membranes with known extractants, such as Cyanex 272 and Cyanex 301, have been proposed for separating cobalt in the presence of nickel and manganese. Swain et al (Chemical Engineering Journal, 2015. 271, p. 61-70) investigated the separation of cobalt by supported hollow fiber and flat sheet liquid membrane solvent extraction using Cyanex 272 as the extractant. The feed solution used in the study was salts of cobalt and lithium, such as cobalt sulfate and lithium sulfate dissolved in sulfuric acid. However, the cobalt chemistry in lithium ion batteries is much more complex than a divalent cobalt salt.

Accordingly, there remains a need for an improved method and system for the recovery of cobalt, and other elements, from lithium ion batteries using supported liquid membrane solvent extraction. In particular, there remains a need for an improved method and system for the selective recovery of constituent elements in substantially pure form from $LiCoO_2$ and $LiNiCoMnO_2$ (nickel-manganese-cobalt or NMC) cathodes in spent lithium ion batteries.

SUMMARY OF THE INVENTION

A method and system for the recovery of elements in substantially pure form from lithium ion batteries are provided. The method and the system include supported membrane solvent extraction using an immobilized organic phase within the pores of permeable hollow fibers for selectively extracting elements from a feed solution having a regulated pH. The permeable hollow fibers are contacted by an aqueous feed solution on one side, and a strip solution on another side, to provide the simultaneous extraction and stripping of elements from dissolved lithium ion cathode materials, while rejecting other elements from the feed solution.

In one embodiment, the method includes wetting the pores of the plurality of hollow fibers with an organic phase having a cationic liquid extractant and an organic solvent. The method then includes moving an aqueous feed solution along one side of the hollow fibers, the aqueous feed solution including a dissolved cobalt-containing battery material, for example $LiCoO_2$ or $LiNiCoMnO_2$. The method includes simultaneously moving a strip solution along the other side of the hollow fibers, the aqueous feed solution being pressurized with respect to the strip solution (about 2 psig), such that the ionic liquid extractant in the pores of the plurality of hollow fibers continuously extracts Co(II) from the aqueous feed solution for recovery by the strip solution.

In another embodiment, the system includes a membrane module, a feed reservoir, and a strip reservoir. The membrane module includes a plurality of hollow fibers, and the pores of the hollow fibers are wetted (pre-impregnated) with an immobilized organic phase. The feed reservoir and the strip reservoir include an aqueous feed solution and a strip solution, respectively, which are in continuous recirculation through the membrane module. The aqueous feed solution is directed along the lumen side of the hollow fibers and the strip solution is directed along the shell side of the hollow fibers, optionally in transverse flow directions. In other embodiments, the aqueous feed solution is directed along the shell side of the hollow fibers and the strip solution is directed along the lumen side of the hollow fibers. The aqueous feed solution includes a cobalt-containing battery material and is pressurized relative to the strip solution. The organic phase within the pores of the hollow fibers includes an organic solvent and a cationic extractant, for example Cyanex 272 or Cyanex 301, that is selected to continuously extract cobalt (e.g., Co(II)) from the aqueous feed solution for recovery by the strip solution.

The method and system of the present invention can facilitate the simultaneous extraction and stripping of cobalt, and other elements, from lithium ion cathode materials using an immobilized organic phase within the pores of hollow fibers. For example, multi-stage systems discussed herein can selectively recover cobalt, manganese, nickel, and lithium from spent battery cathodes. The systems and methods discussed herein are not limited by equilibrium constraints as compared to traditional solvent extraction processes. Non-dispersive solvent extraction methods using supported liquid membranes with cationic extractants were demonstrated by the inventors in laboratory examples to recover critical elements in substantially pure form, and includes the pretreatment of cathodes and anodes prior to supported membrane solvent extraction.

These and other features and advantages of the present invention will become apparent from the following description of the invention, when viewed in accordance with the accompanying drawings and appended claims.

BRIEF DESCRIPTION OF THE DRAWINGS

FIG. 6(a) depicts the concentration of the feed solution; FIG. 6(b) depicts the concentration of the strip solution; FIG. 6(c) depicts the purity (%) of Co in the feed and the strip; FIG. 6(d) depicts Co recovery over time; and FIG. 6(e) depicts Co extraction rate over time.

FIG. 7(a) depicts the concentration of the feed solution; FIG. 7(b) depicts the concentration of the strip solution; FIG. 7(c) depicts the purity (%) of Co in the feed and the strip; FIG. 7(d) depicts Co recovery over time; and FIG. 7(e) depicts Co extraction rate over time.

FIG. 8(a) depicts the concentration of the feed solution; FIG. 8(b) depicts the concentration of the strip solution; FIG. 8(c) depicts the purity (%) of Co in the feed and the strip; FIG. 8(d) depicts Co recovery over time; and FIG. 8(e) depicts Co extraction rate over time.

FIG. 9(a) depicts the concentration of the feed solution; FIG. 9(b) depicts the concentration of the strip solution; FIG. 9(c) depicts the purity (%) of Co in the feed and the strip; FIG. 9(d) depicts Co extraction rate; and FIG. 9(e) depicts Co extraction rate over time.

FIG. 10(a) depicts the concentration of the strip solution over time; FIG. 10(b) depicts the concentration of the feed solution over time; FIG. 10(c) depicts the purity (%) of Co in the feed and the strip solution over time; FIG. 10(d) depicts Co recovery over time; and FIG. 10(e) depicts Co extraction rate over time.

FIG. 11(a) depicts the concentration of the strip solution over time; FIG. 11(b) depicts the concentration of the feed solution over time; FIG. 11(c) depicts the purity (%) of Co in the feed and the strip solution over time; FIG. 11(d) depicts Co recovery over time; and FIG. 10(e) depicts Co extraction rate over time.

FIG. 12(a) depicts the concentration of the strip solution over time; FIG. 12(b) depicts the concentration of the feed solution over time; FIG. 12(c) depicts the purity (%) of Ni in the feed and the strip solution over time; FIG. 12(d) depicts Ni recovery over time; and FIG. 10(e) depicts Ni extraction rate over time.

DETAILED DESCRIPTION OF THE CURRENT EMBODIMENTS

The invention as contemplated and disclosed herein includes methods and systems for the recovery of constituent elements from lithium ion batteries through membrane assisted solvent extraction. In general terms, the method include the following steps for single- or multi-stage extraction of one or more constituent elements: a) providing a membrane module including a plurality of porous hollow fibers, b) wetting the plurality of porous hollow fibers with an organic phase including a cationic extractant and an organic solvent, c) applying a continuous flow rate of an acidic aqueous feed solution, at a predetermined pH, along the lumen side or the shell side of the plurality of porous hollow fibers, and d) applying a continuous flow rate of an acidic strip solution, at a predetermined pH, along the other of the lumen side or the shell side of the plurality of porous hollow fibers. The step of wetting the plurality of porous hollow fibers (step (b)) is performed prior to the steps of applying a flow rate of feed solution and a flow rate of strip solution (steps (c) and (d)). The steps of applying a flow rate of feed solution and a flow rate of strip solution are generally simultaneous. These steps are discussed below in connection with single-stage separation (Part I) and multi-stage separation (Part II).

I. Single-Stage Separation

Figure 1:
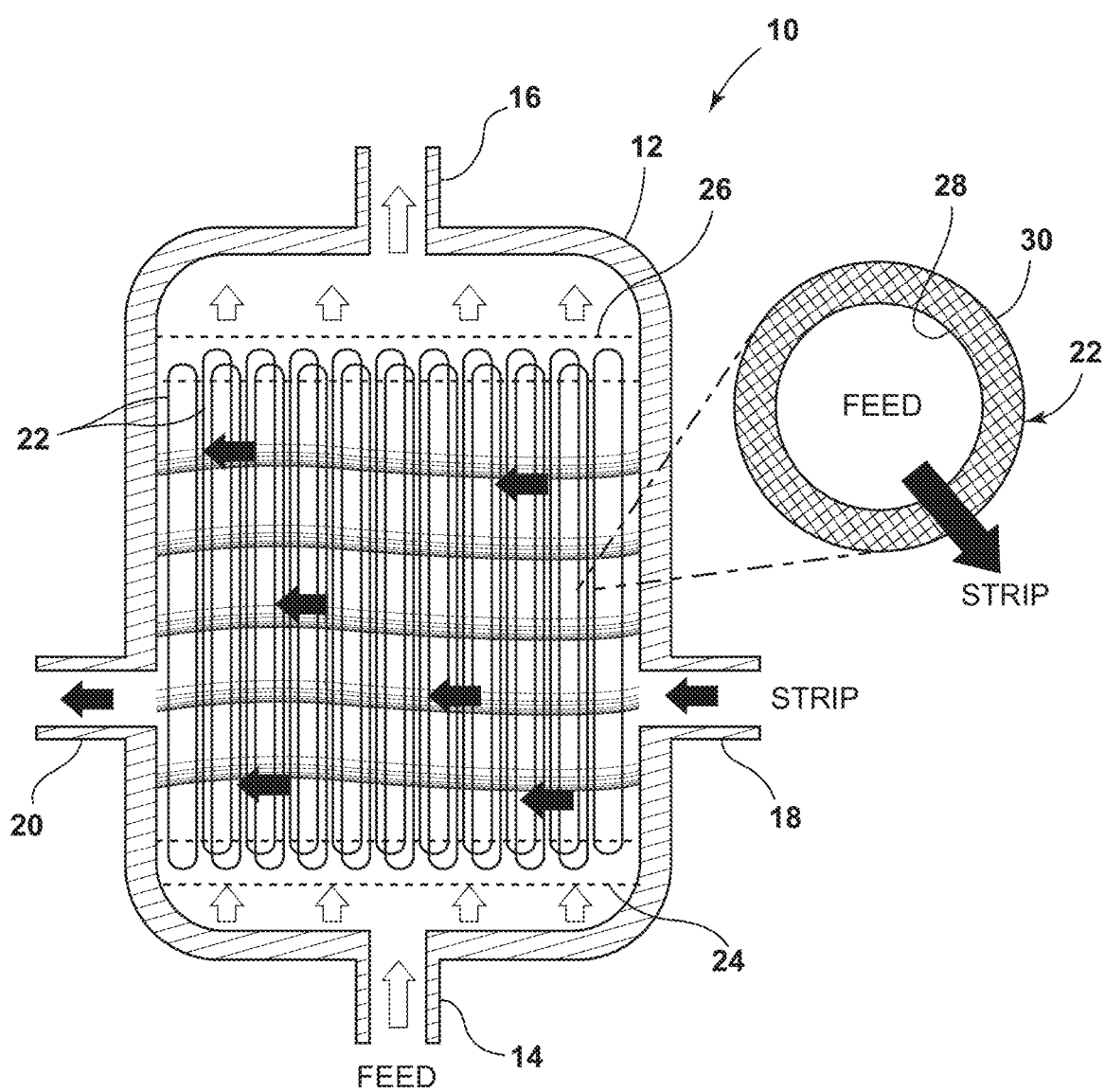
FIG. 1 is an illustration of a membrane module in accordance with a system and a method of the present invention.

Providing a membrane module generally includes providing a plurality of hollow or tube-like fibers extending between opposing tubesheets. By way of illustration, a membrane module containing a fiber bundle is illustrated in FIG. 1 and generally designated 10. The membrane module 10 includes an outer casing 12 including a feed input port 14, a feed output port 16, a strip input port 18, and a strip output port 20. A suitable membrane module can include a hydrophobic polypropylene membrane module (MicroModule® by Membrana GmbH or MiniModule® by Membrana-Charlotte, LLC) with a membrane module area of 1.4 m². The plurality of hollow fibers 22 are potted to first and second tubesheets 24, 26 at opposing ends thereof, such that the fibers 22 extending in a common direction. Each fiber 22 includes a lumen side 28 and a shell side 30. The lumen side 28 is illustrated in FIG. 1 as being exposed to the feed solution, however in other embodiments the lumen side 28 is exposed to the strip solution. Similarly, the shell side 30 is illustrated in FIG. 1 as being exposed to the strip solution, however in other embodiments the shell side 30 is exposed to the feed solution. As used herein, the "lumen side" includes the interior surface that defines a channel extending longitudinally through the length of the hollow fiber, and the "shell side" includes the exterior surface of the fiber, such that the lumen side and the shell side are spaced apart from each other by the thickness of the membrane sidewall. The side in contact with the feed solution defines the "feed interface," and the side in contact with the strip solution defines the "strip interface." The lumen side is the feed interface in some embodiments and is the strip interface in other embodiments. Similarly, the shell side is the strip interface in some embodiments and is the feed interface in other embodiments.

The hollow fibers 22 are porous to retain an organic phase therein and are formed of a material that is able to withstand the acidic conditions in the feed solution and the strip solution. The hollow fibers 22 can be formed from a hydrophobic material, which assists in preventing the wetting of the fibers by the aqueous feed solution and which can also prevent the displacement of the organic phase into the strip solution. Hydrophobic materials can include, for example, polypropylene, polyethylene, polyvinylidene fluoride, polyether ether ketone, polysulfone, or polyethersulfone. The pore size is selected such that the organic phase containing the extractant is not displaced by contact with a pressurized feed solution at pressures of about 2 psi higher than the pressure on the strip side of the fibers, optionally less than 5 psi higher than the pressure of the strip solution. The hollow fibers include a mean pore size of less than 0.1 micron in some embodiments, while in other embodiments the mean pore size is between 0.01 micron and 0.1 micron inclusive. The hollow fibers include a mean inner diameter of between 0.1 mm and 1.0 mm inclusive, further optionally between 0.2 mm and 0.3 mm inclusive. The hollow fibers include a mean outer diameter of between 0.1 mm and 1.0 mm inclusive, further optionally between 0.6 mm and 0.7 mm inclusive. The hollow fibers have a mean sidewall thickness of between 0.01 mm and 0.1 mm inclusive, further optionally between 0.02 mm and 0.03 mm inclusive.

Wetting the plurality of porous fibers with an organic phase generally includes directing the organic phase through the feed input port 14 for a predetermined period (e.g., one hour) to saturate the fibers with the organic phase. The flow of organic phase is stopped after a sufficient period has elapsed, resulting in an immobilized organic phase within the pores of the plurality of fibers. After wetting, the distilled water is circulated through both input ports 14, 18 to wash out excess organic phase from the membrane module 10. The immobilized organic phase includes a cationic extractant (discussed below) and an organic solvent. The organic solvent includes a synthetic isoparaffinic hydrocarbon solvent, for example Isopar-L (Exxon Mobile Corporation). Other immobilized organic phases can be used in other embodiments where desired. Optionally, the immobilized organic phase includes tributyl phosphate (TBP), however TBP is not required, and in some embodiments the immobilized organic phase is free from TBP. This is because TBP is conventionally used in solvent extraction processes to prevent the formation of third phase, which is the separation of the organic phase into two liquids as observed in the form of an emulsion. Third phase is generally attributed to the limited solubility of the extractant in the organic diluent and high acid strength used in the feed and stripping solutions. There is no third phase formation in the present membrane solvent extraction process because the amount of organic phase imbedded in each pore of the hollow fiber membrane is very low. Additionally, dilute acid solutions are used in membrane solvent extraction process which prevent emulsion formation. Hence, the organic phase is not required to include TBP, and in many embodiments no TBP is used.

The extractant can be selected to recover certain elements while rejecting others when used according to the systems and methods described herein. For example, the extractant can include bis(2,4,4-trimethylpentyl)phosphinic acid (Cyanex 272, Cytec Inc.) or methylpentylphosphinodithioic acid (Cyanex 301, Cytec Inc.). The extractant can include Cyanex 272 to extract Co and Mn from a feed solution with pH of between 4.0 and 6.0, inclusive, further optionally 5.0 to 6.0, inclusive, while substantially rejecting Ni and Li. Also by example, the extractant can include Cyanex 272 to extract Co from a feed solution having a pH between 5.0 and 6.0 inclusive, more specifically about 5.9, while substantially rejecting Li. Also by example, the extractant can include Cyanex 272 to extract Ni from a feed solution having a pH between 6.0 and 7.5 inclusive, more specifically 6.0 to 6.5, inclusive, while substantially rejecting Li. Also by example, the extractant can include Cyanex 301 to extract Co from a feed solution having a pH of 1.5 or less while substantially rejecting Mn. Also by example, the extractant can include Cyanex 301 to extract Co and Ni from a feed solution having a pH of between 1.0 and 3.0, inclusive, while substantially rejecting Li. The addition of an acetate buffer during the extraction process, for example sodium acetate, maintains a high extraction rate by controlling the decrease in pH in the feed solution. As used herein, "substantially rejecting" means the elemental molarity (moles per liter of solution) of the receiving solution is less than 1% of the elemental molarity (moles per liter of solution) of the donating solution for the rejected element after membrane solvent extraction of one hour, unless otherwise stated.

Directing a continuous flow rate of an acidic aqueous feed solution along the lumen side or the shell side of the plurality of porous hollow fibers includes directing an acidic aqueous feed solution through the feed input port 14. The acidic aqueous feed solution includes dissolved cathode material from post-consumer lithium ion batteries, for example $LiCoO_2$ cathode material and $LiNiCoMnO_2$ (NMC) cathode material. The feed solution has a pH that is selected based on the extractant. For Cyanex 272, the feed solution can have a pH of 5.5 to 6.0, inclusive, which can be achieved by dissolving the cathode material in 0.2-4 M $H_2SO_4$ with up to 5 vol. % of $H_2O_2$ as a reducing agent to convert Co(III) to Co(II), which is more soluble than Co(III). For Cyanex 301, the feed solution can have a pH of 1.2 to 3.0, inclusive, which can be achieved by dissolving the cathode material in 0.2-4 M $H_2SO_4$ with up to 5 vol. % of $H_2O_2$ as a reducing agent to convert Co(III) to Co(II). The addition of an acetate buffer, for example sodium acetate, maintains a high extraction rate by setting the initial pH of the feed solution, which is regulated during membrane solvent extraction to be within a predetermined range with the intermittent addition of a buffer, for example sodium acetate and/or base, for example ammonium hydroxide. The feed solution can alternatively include cathode material dissolved in $HNO_3$ or HCl at the desired molar concentration. The feed solution can be directed through the module 10 along the lumen side 28 of each of the plurality of porous hollow fibers 22 as shown in FIG. 1. Alternatively, the feed solution can be directed through the module 10 along the shell side 30 of each of the plurality of fibers 22.

Directing a continuous flow rate of an acidic aqueous strip solution along the lumen side or the shell side of the plurality of permeable fibers for back-extraction includes directing a strip solution through the strip input port. The strip solution as adapted to strip Co(II), or other constituent elements, that have diffused from the feed interface to the strip interface. The strip solution can include $H_2SO_4$, $HNO_3$, or HCl, for example, at a higher molar concentration than in the feed solution. That is, a concentration gradient and hence a chemical potential gradient is generally formed between feed solution and the strip solution. The strip solution is directed through the module 10 along the shell side 30 of each of the plurality of fibers 22 as shown in FIG. 1 above, optionally in a direction generally transverse to the flow of the feed solution within the fibers 22. Alternatively, the strip solution can be directed through the interior of the hollow fibers 22 to contact the lumen side 28 thereof.

Figure 2:
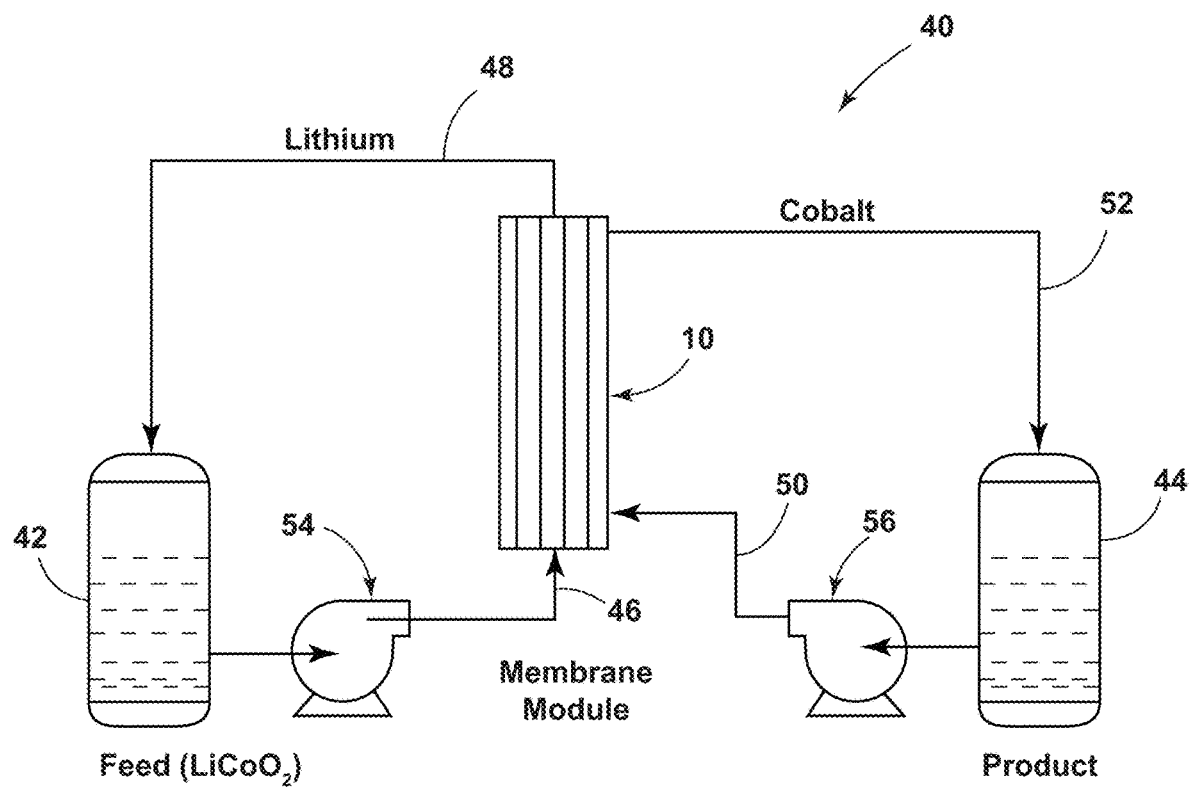
FIG. 2 is an illustration of a single-stage system including the membrane module of FIG. 1.

To further illustrate the circulation of the feed solution and the strip solution, a system for membrane assisted solvent extraction is illustrated in FIG. 2 and generally designated 40. The system 40 includes a feed reservoir 42, a strip reservoir 44, a membrane module 10, a feed line 46, a feed return line 48, a strip line 50, and a strip return line 52. The feed solution is contained within the feed reservoir 42 and kept under constant agitation with a mechanical stirrer to ensure a uniform concentration. The feed line 46 includes a pump 54, for example a peristaltic pump, to ensure the feed line pressure is slightly greater than the strip line pressure. In some applications the feed can be pressurized up to and including 2 psig, optionally less than 5 psig, while the strip can be maintained at atmospheric pressure. The strip line 50 also includes a pump 56, for example a peristaltic pump, to ensure a continuous flow of strip solution through the module 10. The feed solution and the strip solution are in continuous recirculation. However, in other embodiments the feed line and/or the strip line form an open circuit.

The method can also include filtering, drying and/or annealing the strip solution to recover highly pure cobalt. For example, the strip solution can be precipitated out with oxalic acid or ammonium hydroxide, followed by filtration, drying at room temperature, and annealing. An optional annealing profile can include 750° C. for two hours. The step of filtering, drying, and annealing the strip solution is optional, however, and can be replaced or modified as desired depending on the intended use of the recovered cobalt. The strip solution can alternatively be recycled through the supported membrane solvent extraction module 10 or a second supported membrane solvent extraction module.

II. Multi-Stage Separation

Figure 3:
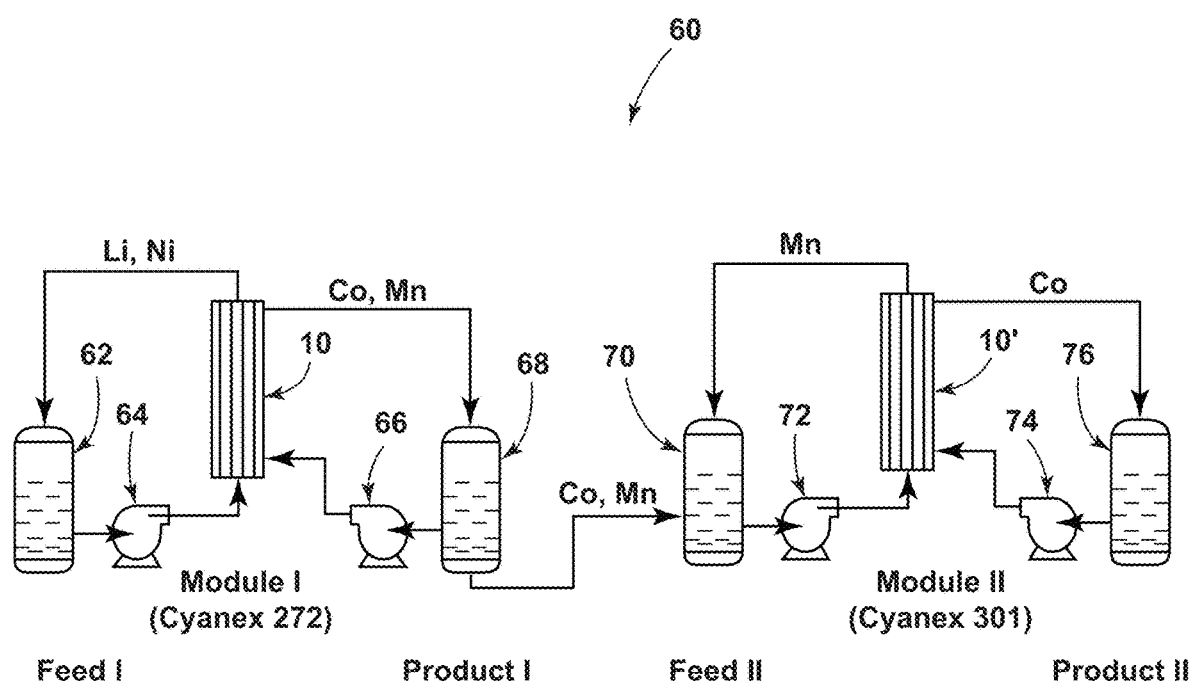
FIG. 3 is an illustration of a dual-stage system including the membrane module of FIG. 1.

A two-stage system for the recovery of cobalt is shown in FIG. 3 and generally designated 60. In this system, a first stage recovery of Co and Mn is performed by using a first membrane module 10, and a second stage recovery of Co is performed by a second membrane module 10'. The first stage recovery includes a first feed reservoir 62, a first membrane module 10, a feed pump 64, a strip pump 66, and a first strip reservoir 66. The second stage recovery includes a second feed reservoir 70, a second membrane module 10', a feed pump 72, a strip pump 74, and a second strip reservoir 76. The first membrane module 10 includes hollow fibers that are pre-impregnated with a first immobilized organic phase adapted to recover Co and Mn from dissolved NMC cathode materials, for example Cyanex 272. The second membrane module 10' includes a second immobilized organic phase that is adapted to recover Co from the second feed solution. The second feed solution contains Co and Mn from the first strip solution. More specifically, the first membrane module 10 includes an immobilized organic phase including Cyanex 272 in Isopar-L, while the second membrane module 10' includes an immobilized organic phase including Cyanex 301 in Isopar-L. In the current embodiment, the pH of the first feed solution is between 5.5 and 6.0, and the pH of the second feed solution is optionally adjusted with ammonium hydroxide to be approximately 2.0.

Figure 4:
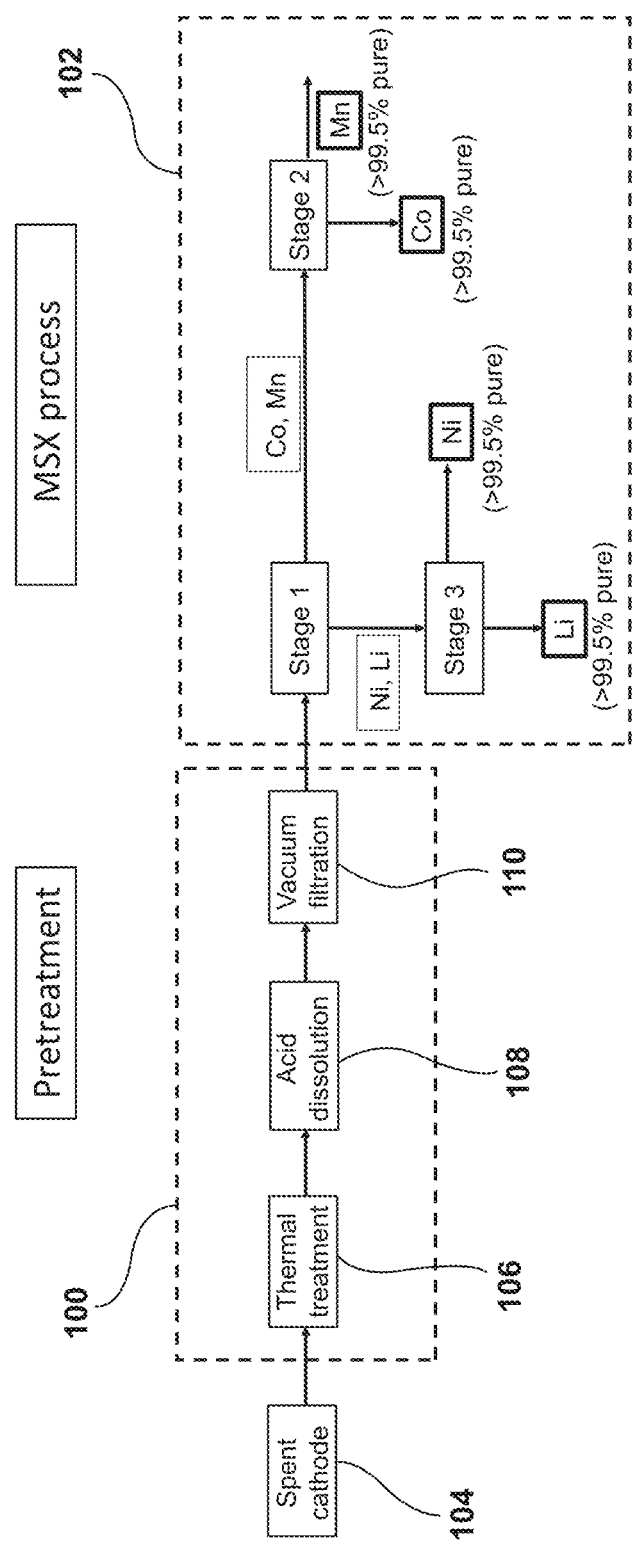
FIG. 4 is an illustration of a three-stage system including a pretreatment process and a membrane solvent extraction process including the membrane module of FIG. 1.

A three-stage method for the recovery and separation of Li, Ni, Co, and Mn from spent cathode material is shown in FIG. 4 and includes a pretreatment process 100 and a multi-stage membrane solvent extraction process 102. The spent cathode material 104 in this embodiment includes active material and an aluminum support. The active material typically contains Li, Ni, Co, and Mn in the form of a fine powder. The fine powder is aggregated with a polyvinylidene fluoride (PVDF) binder and a carbon additive. Cathode material is then pressed together on the Al support before being incorporated into a lithium ion battery. Though not shown, the present method can also be used to recover copper (Cu) from the battery anode, which typically includes an active material on a copper support. Additionally, Cu and Al present in the cathode material can also be separated and recovered using supported membrane solvent extraction using extractants such as ACORGA M5640 and Cyanex 801.

To first remove the PVDF binder and the carbon additive, the cathode sheets are subject to thermal treatment 106, acid dissolution 108, and vacuum filtration 110. Cathode sheets are heated to a temperature above 500° C. in an inert atmosphere to decompose PVDF to permit easy removal of the cathode material from the Al support. In addition, carbon black, which is present in the cathode material to increase the conductivity of oxide cathodes, undergoes redox reactions with active cathode material around 550° C. This causes a partial reduction of transition metals present in the cathode powder, thereby reducing the amount of $H_2O_2$ required during acid dissolution 108. Because the melting point of Al is about 650° C., thermal treatment 106 includes a temperature range of between 550° C.-650° C., inclusive ("inclusive" as used in this disclosure includes both lower and upper values). More specifically, the cathodes sheets are heated to 570° C. in a nitrogen atmosphere by gradually ramping up the temperature at a rate of 10° C./min, held at 570° C. for 25 minutes, and gradually reduced to room temperature. The cathode sheets are then washed with water to separate the Al support from the cathode powder. After acid dissolution of the cathode powder, the carbon additive present in the cathode material is removed using vacuum filtration 110.

Figure 5:
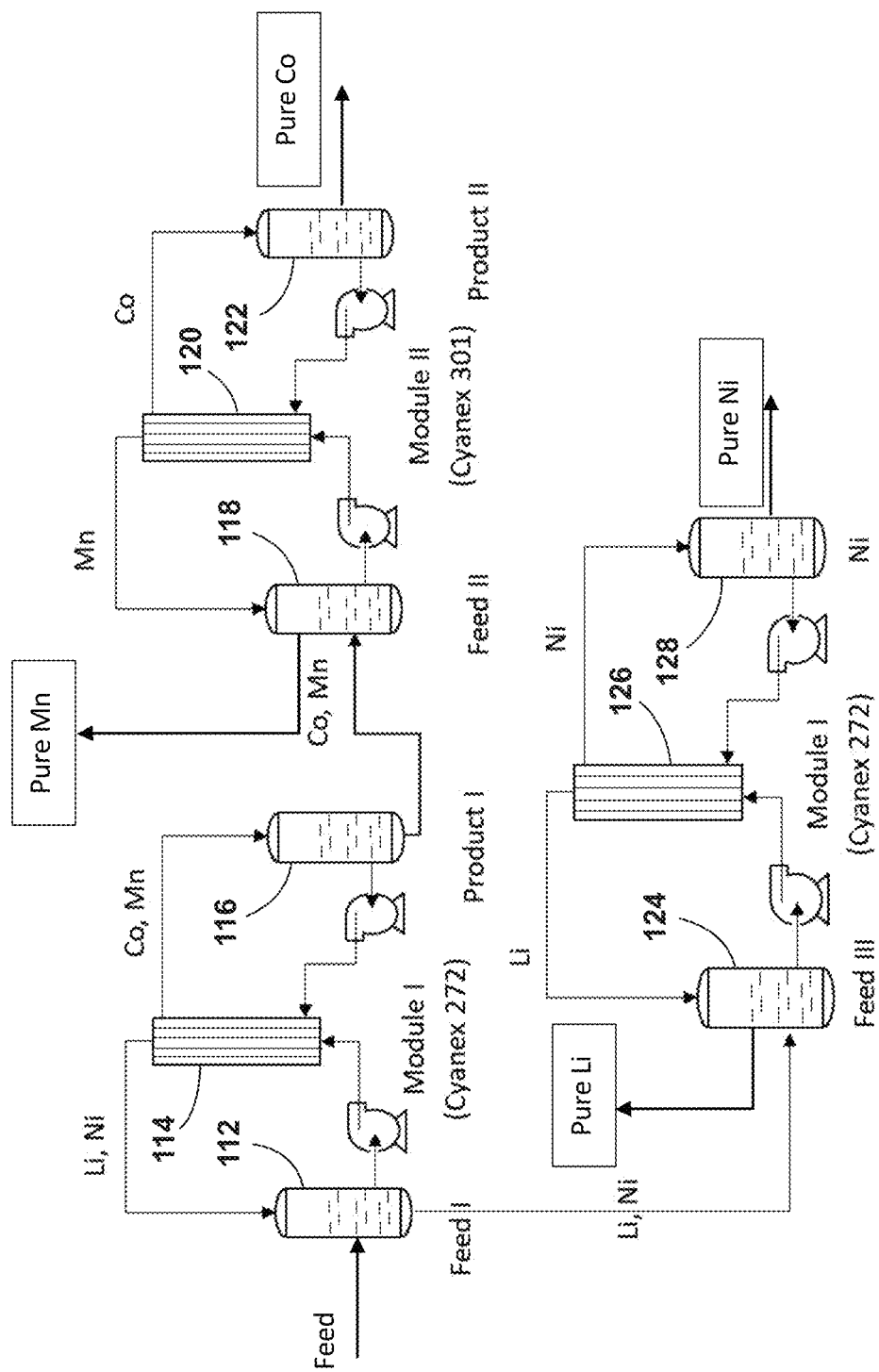
FIG. 5 is an illustration of a three-stage system including the membrane module of FIG. 1.

The multi-stage recovery membrane solvent extraction process 102 is illustrated in FIG. 5 and includes a first stage separation of Co and Mn from Li and Ni, a second stage separation of Co from Mn, and a third stage separation of Ni from Li. The first stage separation includes a first feed reservoir 112, a first membrane module 114, and a first strip reservoir 116. The first feed reservoir 112 includes a feed solution, and the feed solution includes cathode material 104 from the pretreatment process 100 dissolved in a strong acid, for example $H_2SO_4$, with a reducing agent, for example up to 5 vol. % $H_2O_2$. The feed solution is pH-stabilized between 4.0 and 6.0, inclusive, and includes an acetate buffer, for example sodium acetate buffer solution. The first membrane module 114 includes hollow fibers that are pre-impregnated with a first immobilized organic phase including a cationic extractant, for example 1M Cyanex 272, and an organic solvent, for example Isopar-L. The organic phase can include 33 vol. % Cyanex 272, 5 vol. % TBP, and balance Isopar-L, however TBP can be omitted without affecting stage-one separation and recovery. For back extraction, the first strip reservoir 116 includes a strong acid, for example 0.75M $H_2SO_4$, moving continuously through the first membrane module 114. As a result of the transfer of $H^+$ ions from the strip solution, the pH of the feed solution decreases, which is abated with the intermittent addition of buffer, for example sodium acetate and/or base, for example ammonium hydroxide to regulate the pH of the feed solution to between 4.0 and 6.0 inclusive, further optionally 5.5. Co and Mn concentration increases in the strip solution over time, with a negligible transfer of Li and Ni.

The second stage separation includes a second feed reservoir 118, a second membrane module 120, and a second strip reservoir 122. The second feed reservoir 118 includes a second feed solution containing a concentration of Co and Mn recovered from the first strip reservoir 116. The second membrane module 120 includes a second immobilized organic phase that is adapted to recover Co from the second feed solution while substantially rejecting Mn. The feed solution is pH-stabilized at 1.5 or less, for example 1.2, with the addition of buffer, for example sodium acetate and/or base, for example ammonium hydroxide. The second membrane module 120 includes hollow fibers that are pre-impregnated with a second immobilized organic phase including a cationic extractant, for example 1M Cyanex 301, and an organic solvent, for example Isopar-L. The second strip reservoir 122 includes a strong acid, for example 1M $H_2SO_4$, moving continuously through the second membrane module 120 to back extract Co from the organic phase. Co concentration in the strip solution increases over time, with a negligible transfer of Mn.

The third stage separation includes a third feed reservoir 124, a third membrane module 126, and a third strip reservoir 130. The third feed reservoir 124 includes a third feed solution containing a concentration of Li and Ni recovered from the first feed reservoir 112. The third membrane module 126 includes a third immobilized organic phase that is adapted to recover Ni from the first feed solution, while substantially rejecting Li. The feed solution is pH-stabilized to between 6.0 and 6.5, with the addition of buffer, for example sodium acetate and/or base, for example ammonium hydroxide. The third membrane module 126 includes hollow fibers that are pre-impregnated with a third immobilized organic phase including a cationic extractant, for example 1M Cyanex 272, and an organic solvent, for example Isopar-L. The third strip reservoir 130 includes a strong acid, for example 0.75M $H_2SO_4$, moving continuously through the third membrane module 126 to back extract Ni from the organic phase. Ni concentration in the strip solution increases over time, with a negligible transfer of Li.

The method and system therefore provide the recovery and separation of substantially pure cobalt, manganese, nickel, and lithium as part of a continuous and scalable recovery process. The method and system can overcome removal limitations caused by equilibrium effects and can recover critical elements in a highly pure form as demonstrated by the following examples, which are intended to be non-limiting.

Example 1

Figure 6A:
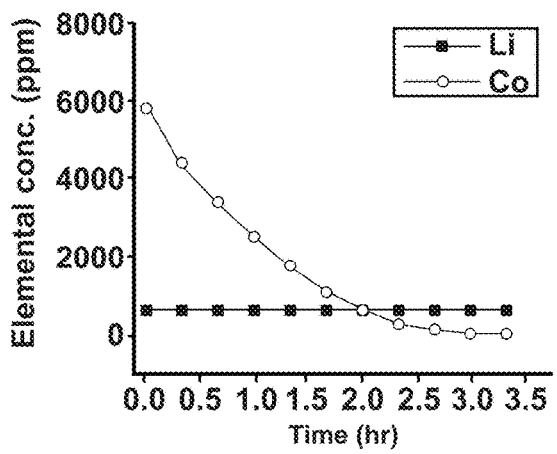
FIGS. 6(a)-6(e) illustrate the recovery of Co from $LiCoO_2$ for Example 1.
Figure 6B:
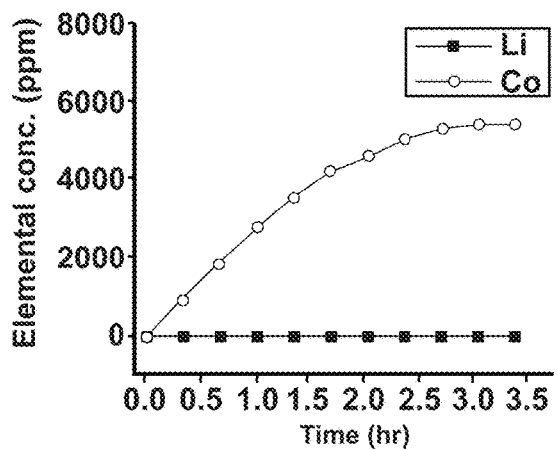
Figure 6C:
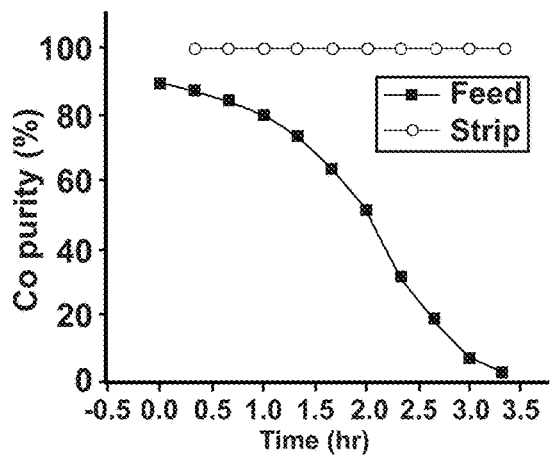
Figure 6D:
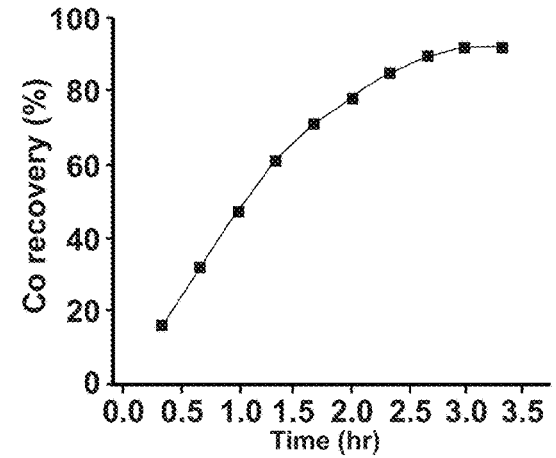
Figure 6E:
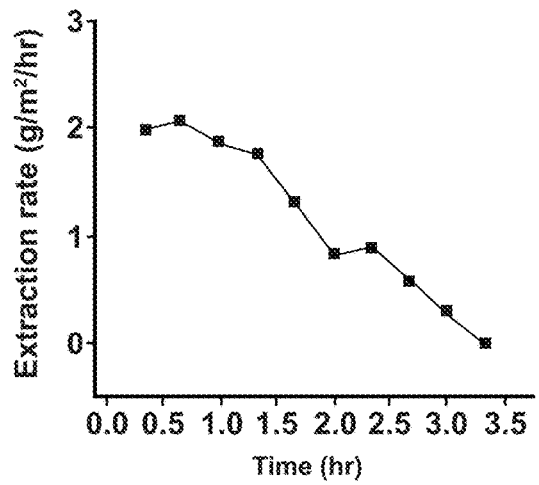

In one example, an aqueous feed solution was prepared by dissolving 10 gm $LiCoO_2$ (Li=663.86 ppm; Co=5826.06 ppm) in 750 mL of 0.2 M $H_2SO_4$, and 2 vol. % $H_2O_2$ was used as a reducing agent. 250 mL of 3M sodium acetate buffer solution at a pH of 5.2 was used to stabilize the pH of the feed solution and to make the final feed solution concentration of 10 gm/L of $LiCoO_2$. The organic phase was 33 vol. % (1 M) Cyanex 272, 5 vol. % tributyl phosphate (TBP), and balance Isopar-L. The strip solution was 1 L of 0.75 M $H_2SO_4$. Initial pH of the feed was adjusted to 5.02 using ammonium hydroxide. The separation performance of Co is presented in FIGS. 6(a)-6(e). The Co content in the strip solution increased with time and 92% recovery of Co was achieved while maintaining a minimal passage of Li into the strip solution (see FIG. 6(b)). 99.6 wt. % pure Co was recovered from membrane solvent extraction using Cyanex 272 as the extractant in organic phase contained in the porous membrane support (see FIG. 6(d)). As a result of the transfer of $H^+$ ions from the strip solution, the pH of the feed solution decreased from 5.02 to 4.66. Extraction rate of Co decreased over time, with a decrease in the concentration of Co in the feed solution (see FIGS. 6(a), 6(c), and 6(e)).

Example 2

Figure 7A:
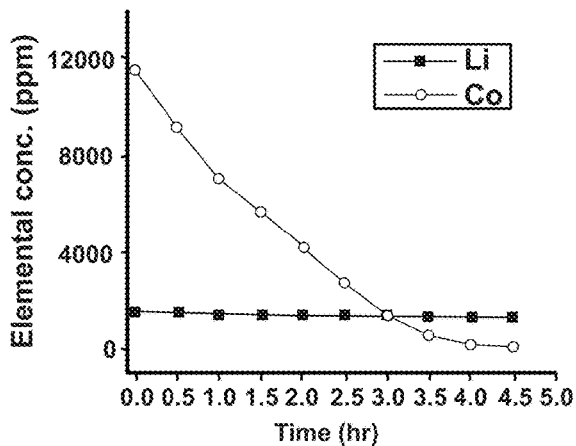
FIGS. 7(a)-7(e) illustrate the recovery of Co from $LiCoO_2$ for Example 2 at a higher initial concentration of Co than depicted in FIGS. 6(a)-6(f).
Figure 7B:
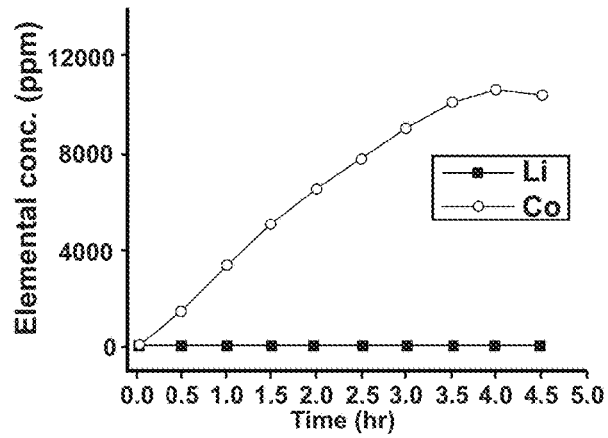
Figure 7C:
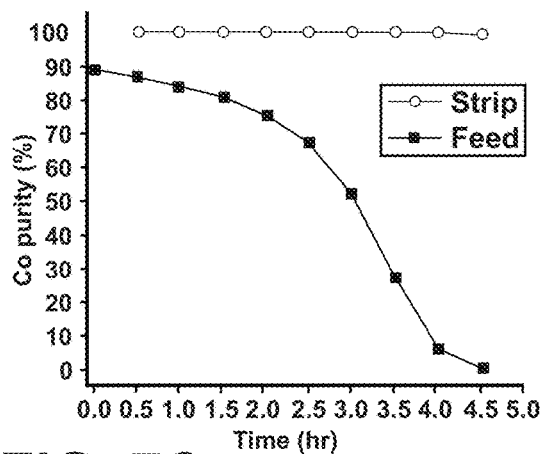
Figure 7D:
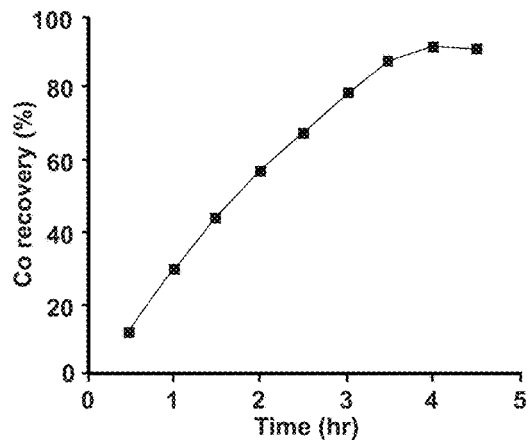
Figure 7E:
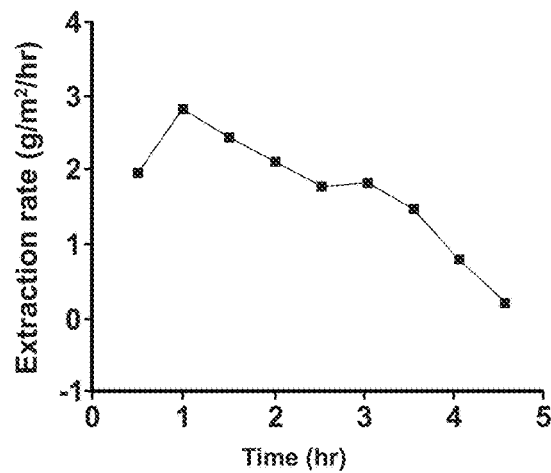

In another example, the feed solution included a higher initial concentration of $LiCoO_2$. In particular, the feed solution included 20,000 ppm $LiCoO_2$ (Li=1486.25 ppm; Co=11532.325 ppm) dissolved in 0.5 M $H_2SO_4$ and 2.5 vol. % $H_2O_2$. The strip solution included 0.75 M $H_2SO_4$. 250 mL sodium acetate buffer was added to the feed solution for pH stabilization. Initial pH of the feed solution was adjusted to 5.5. In order to prevent the reduction in extraction rate with a decrease in pH during experiment, ammonium hydroxide was added to the feed solution intermittently to maintain a pH in the range of 5.5 to 6.0. The separation performance of Co is presented in FIGS. 7(a)-7(e). Co concentration increased in the strip solution with a negligible transfer of Li, and 91% recovery of Co was achieved (see FIGS. 7(b) and 7(d)). 99.5 wt. % pure Co was recovered from membrane solvent extraction using Cyanex 272 as the extractant in the organic phase (see FIG. 7(c)).

Example 3

In this example, a two stage membrane solvent extraction process was used to separate and recover Co from NMC. In the first stage (Module 1 of FIG. 3), Cyanex 272 was used to separate Co and Mn as it favors the selective extraction of Co and Mn within a pH range of 5.5 to 6.0. In the second stage (Module 2 of FIG. 3), Cyanex 301 was used to separate Co and Mn at a feed pH value less than 2.

Figure 8A:
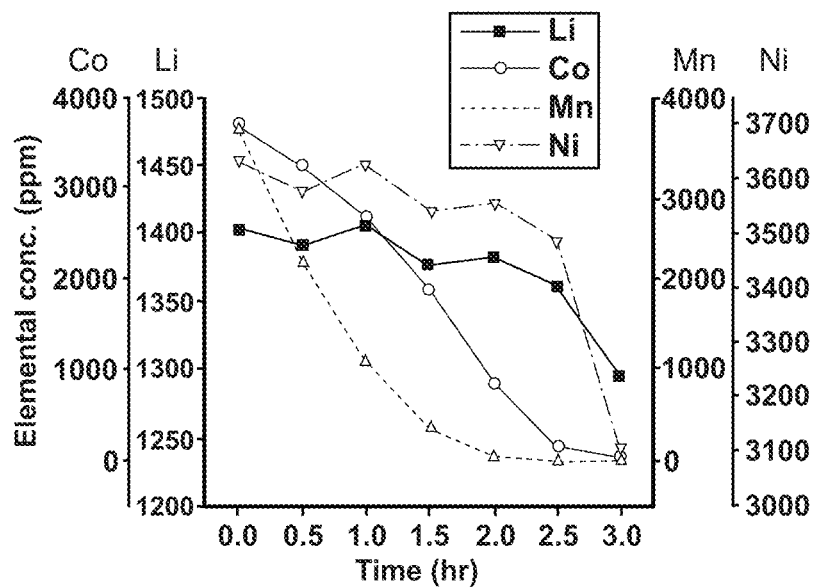
FIGS. 8(a)-8(e) illustrate the stage one recovery of Co from NMC for Example 3.
Figure 8B:
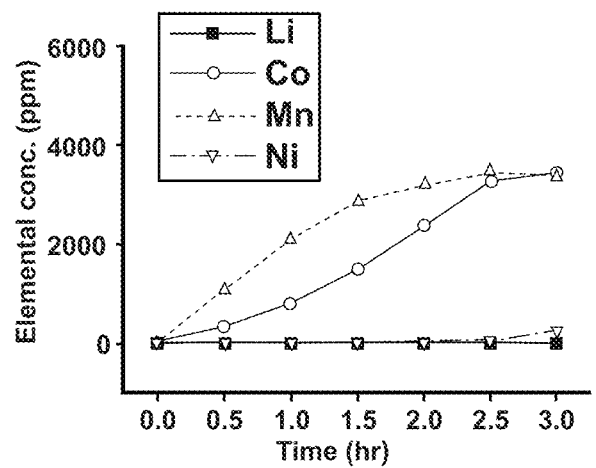
Figure 8C:
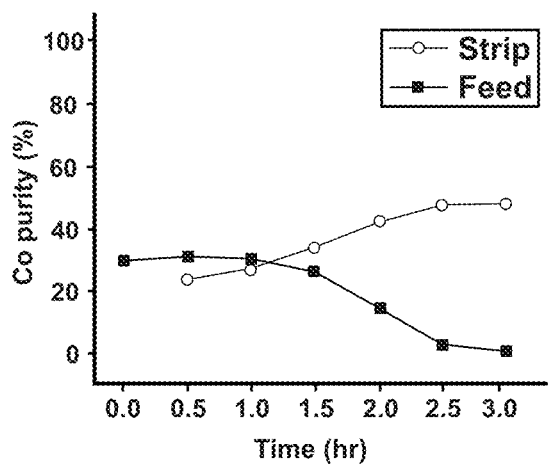
Figure 8D:
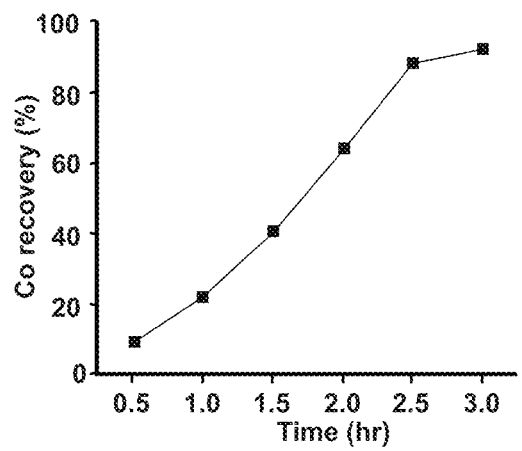
Figure 8E:
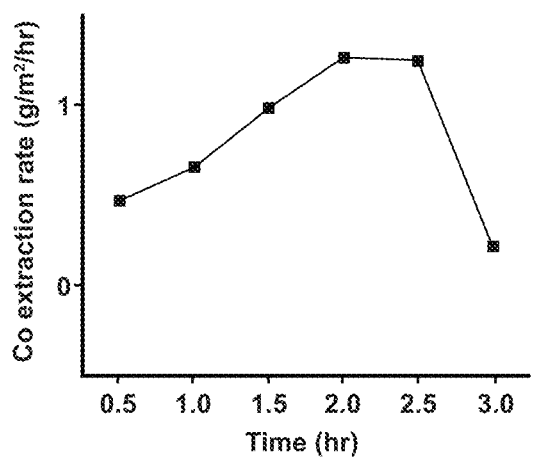
Figure 9A:
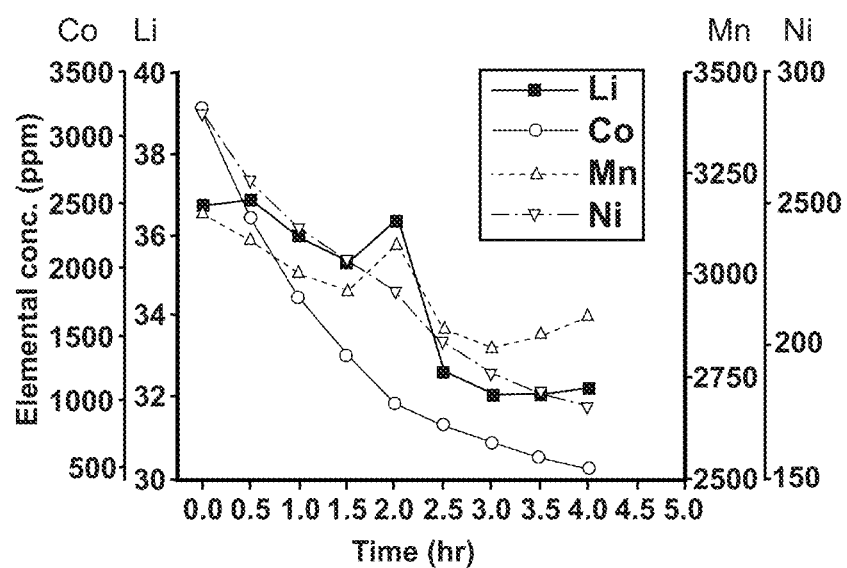
FIGS. 9(a)-9(e) illustrate the stage two recovery of Co from NMC for Example 3.
Figure 9B:
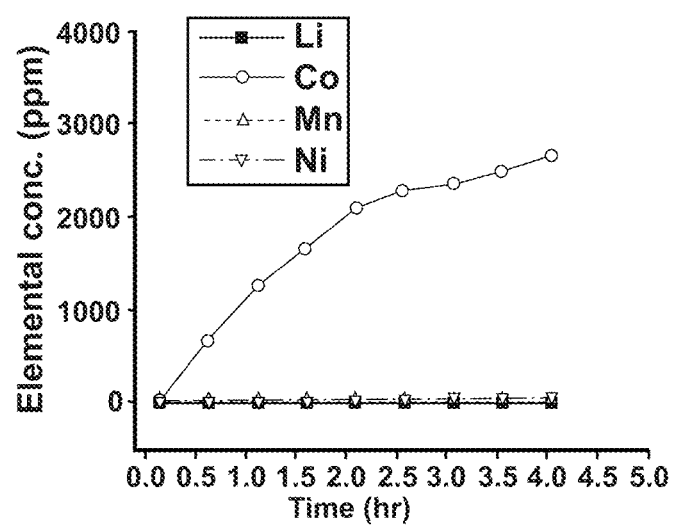
Figure 9C:
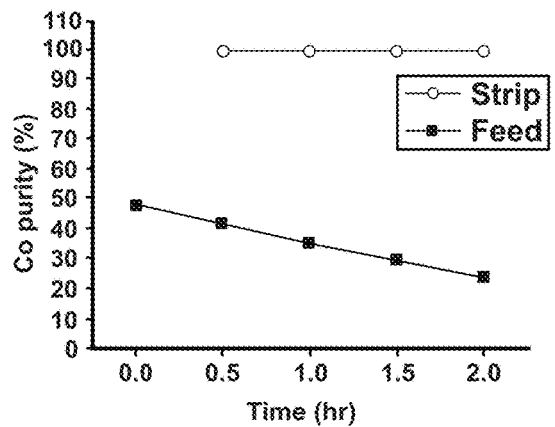
Figure 9D:
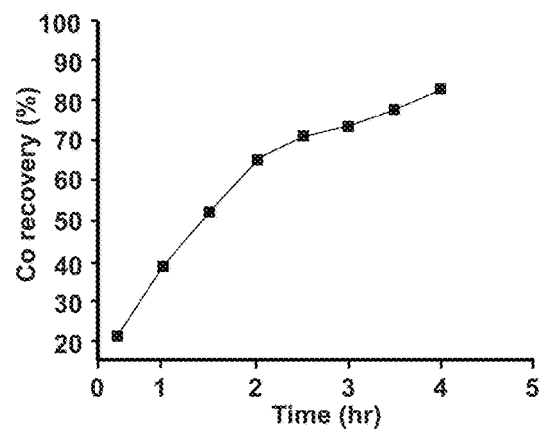
Figure 9E:
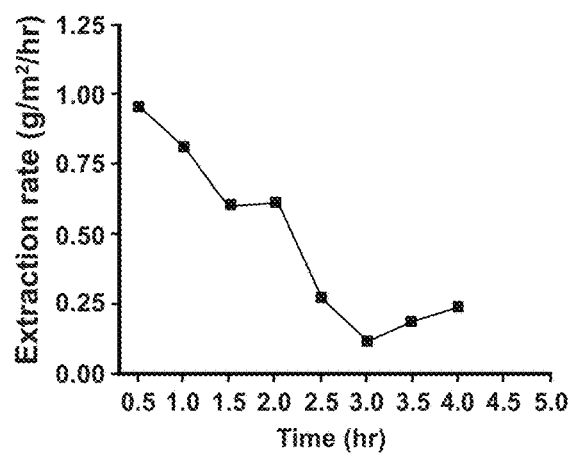
Figure 10A:
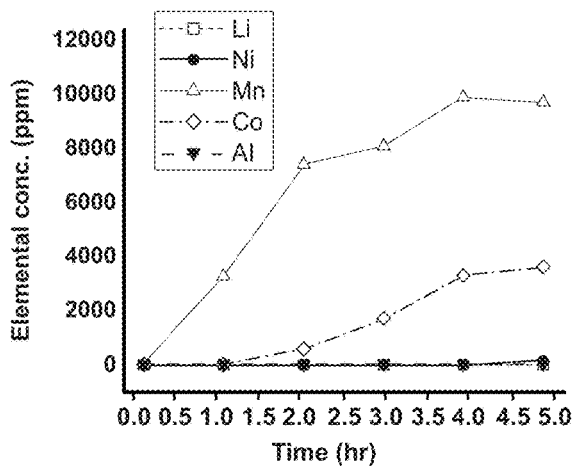
FIGS. 10(a)-10(e) illustrate stage one separation of Co and Mn from Ni and Li for Example 4.
Figure 10B:
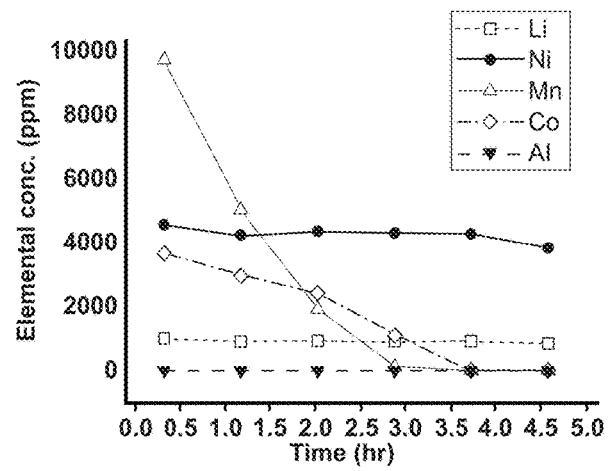
Figure 10C:
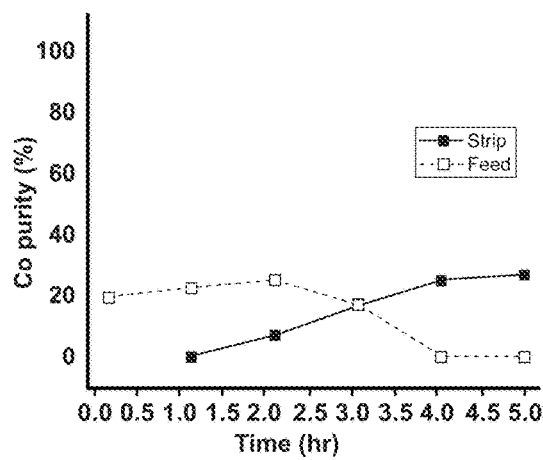
Figure 10D:
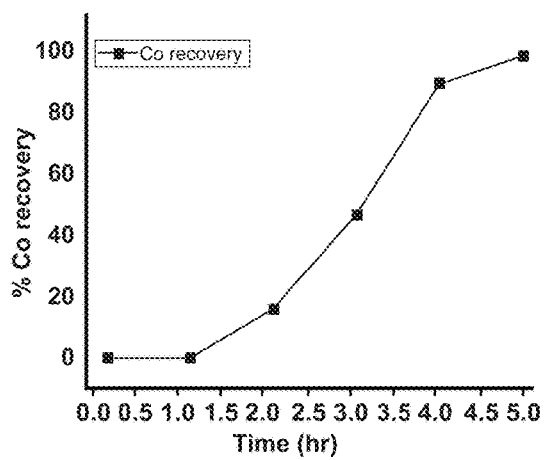
Figure 10E:
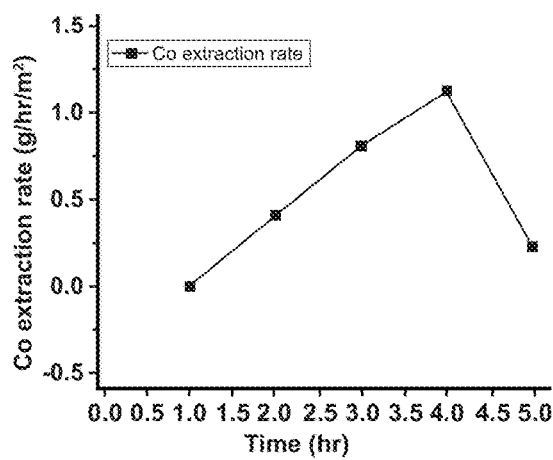
Figure 11A:
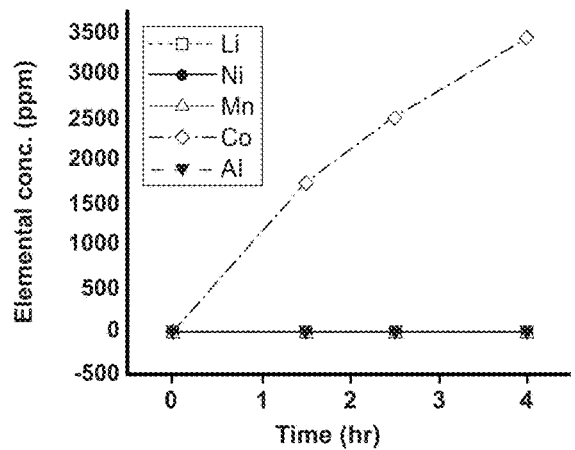
FIGS. 11(a)-11(e) illustrate stage two separation of Co from Mn for Example 4.
Figure 11B:
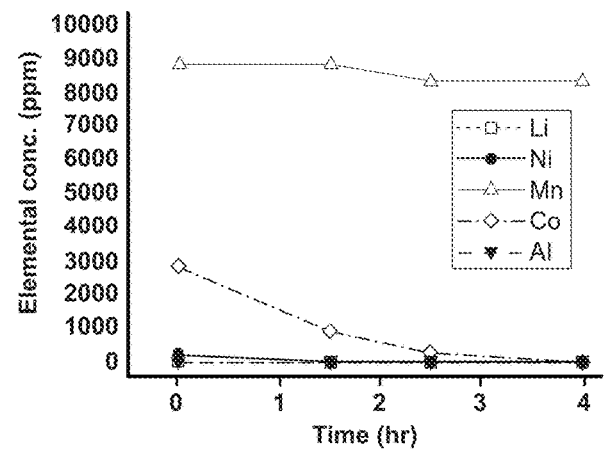
Figure 11C:
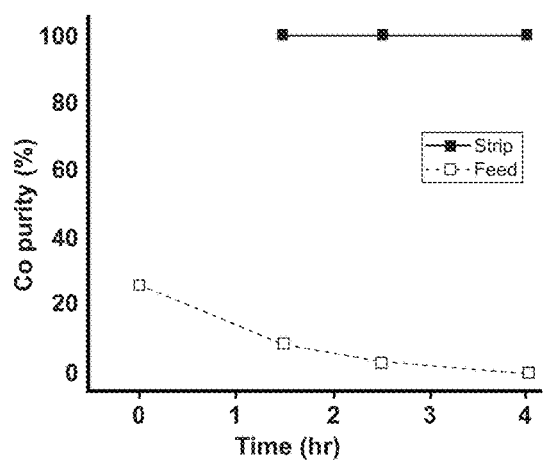
Figure 11D:
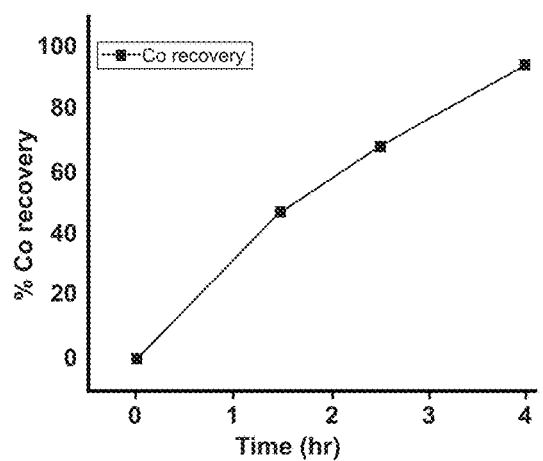
Figure 11E:
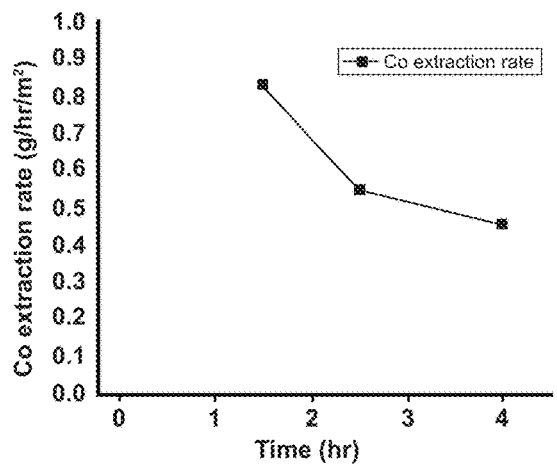
Figure 12A:
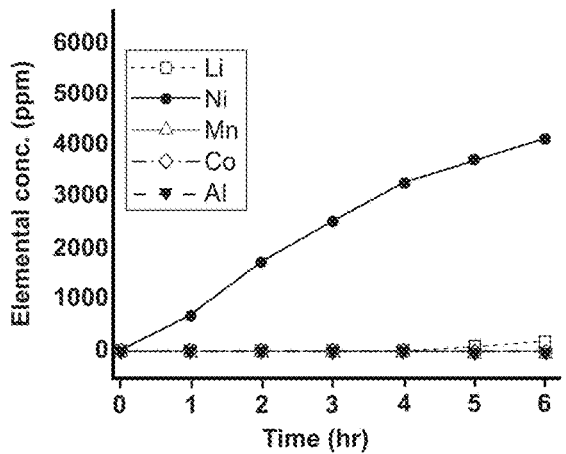
FIGS. 12(a)-12(e) illustrate stage three separation of Ni from Li for Example 4.
Figure 12B:
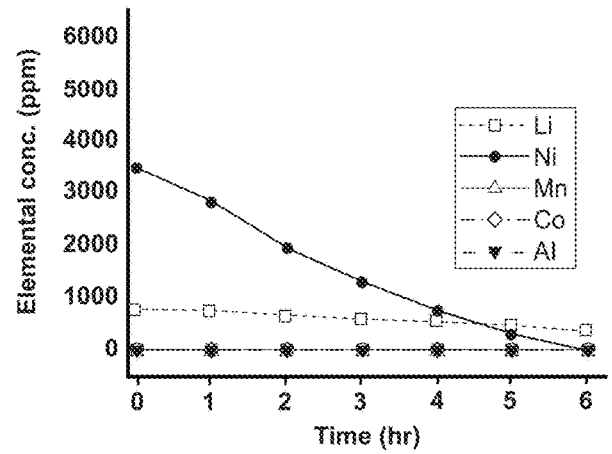
Figure 12C:
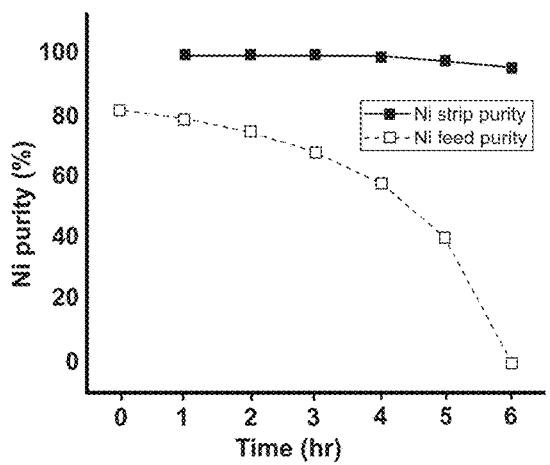
Figure 12D:
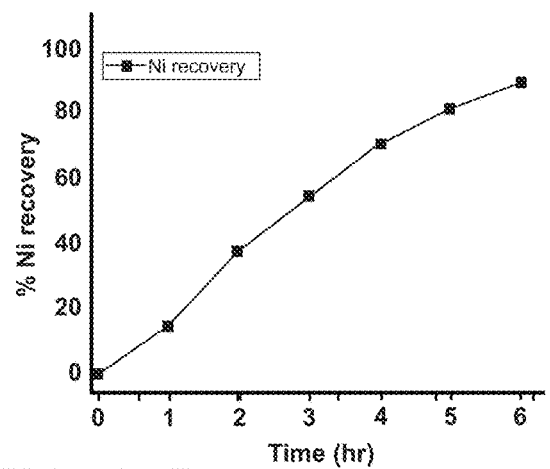
Figure 12E:
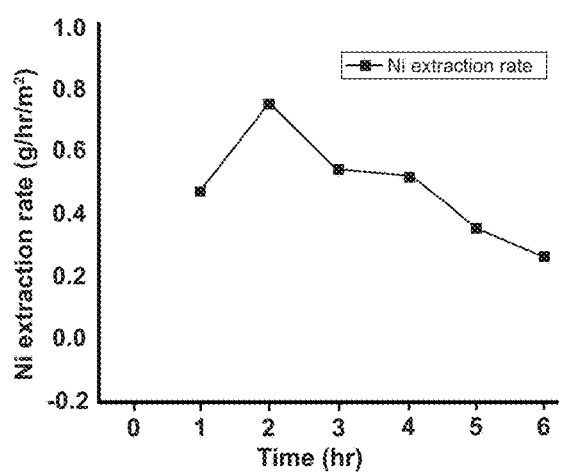

NMC with a Ni:Co:Mn ratio of 1:1:1 was used as feedstock for the membrane solvent extraction process. 20 gm NMC (Li=1402.89 ppm; Co=3698.89 ppm; Mn=3626.08 ppm; Ni=3630.82 ppm) dissolved in 750 mL of 0.5 M $H_2SO_4$ was used and 2 vol. % $H_2O_2$ was used as a reducing agent to convert the insoluble $Co^{3+}$ to the soluble $Co^{2+}$ valence state. 250 mL solution of 3 M sodium acetate buffer solution at a pH of 5.2 was used to stabilize the pH of the feed solution and to make the final feed solution concentration of 20 gm/L NMC cathode material. The extractant used in the first stage was 1 M Cyanex 272 in Isopar L. The strip solution used was 1 L of 0.75 M $H_2SO_4$. Initial pH of the feed solution was adjusted to 5.5 using ammonium hydroxide. The Co and Mn content in the strip solution increased with time and 92% recovery of Co was achieved while maintaining a minimal passage of Ni and no passage of Li (complete rejection) into the strip solution (see FIG. 8(b)). In order to prevent the decrease in extraction rate over time with a decrease in pH, ammonium hydroxide was added to the feed solution intermittently to maintain a pH range of 5.0 to 5.5. The separation and recovery of Co in the first stage is presented in FIGS. 8(a)-8(e).

For the further purification of Co, a second stage of separation was conducted using the final strip solution obtained in the first stage as the feed solution for the second stage. The pH of the feed solution for the second stage was adjusted to 1.34 using ammonium hydroxide. The extractant used in this stage was 1 M Cyanex 301 in Isopar-L. The strip solution used was 1 L of 1 M $H_2SO_4$. Cyanex 301 selectively extracts both Co and Ni while minimizing the co-extraction of Mn at a feed pH value <2. However, the concentration of Ni in the feed solution prepared from the strip solution was negligible. Hence, the second stage was used in order to separate and recover Co from a solution of Co and Mn. The Co content in the strip increased with time and 54% recovery of Co was achieved in two hours while maintaining a minimal passage of Mn into the strip solution. 99.12% pure Co was recovered from membrane solvent extraction using Cyanex 301 as the extractant in the organic phase contained in the membrane support. Feed pH value decreased to 1.04 during the experiment, however the extraction rate of Co was not affected by this change in the pH value. The separation performance of Co in this second stage is presented in FIGS. 9(a)-9(e).

Example 4

In this example, a three-stage membrane solvent extraction process was used to recover substantially pure Ni, Li, Co, and Mn from a spent Chevrolet Volt lithium ion battery. About 60 gm of cathode powder mixed with partially oxidized carbon black was obtained using thermal treatment. The stage-one feed solution was prepared by dissolving 40 gm of cathode material in 750 mL of 4M $H_2SO_4$. Undissolved carbon black was separated from the feed solution using vacuum filtration. 2 vol. % $H_2O_2$ was used as a reducing agent to convert partially reduced Co(III) to the soluble Co(II) valence state. The carbon additive present in the cathode material is insoluble in $H_2SO_4$. A 250 mL solution of 3M sodium acetate buffer solution at a pH of 5.6 was used to stabilize the pH of the feed solution. A feed solution concentration of approximately 30 gm/L spent cathode material was obtained. The feed solution included 1 L of 30,000 ppm spent cathode in 4M $H_2SO_4$, 2 vol. % $H_2O_2$, and 250 mL 3M sodium acetate buffer solution. The initial composition of the feed solution included Li (1005.0 ppm), Co (3663.9 ppm), Ni (4363.7 ppm), and Mn (9721.2 ppm), with no Al detected. The cationic extractant included 1M Cyanex 272 in Isopar-L. The strip solution included 1 L of 0.75M $H_2SO_4$. Initial pH of the feed solution was adjusted to 4.9 using ammonium hydroxide. To prevent the decrease in extraction rate over time with a decrease in pH, ammonium hydroxide was added to the feed solution intermittently to maintain a pH range of 4.5 to 5.0 inclusive over the duration of the run. Within this feed pH, Cyanex 272 extracted both Co and Mn while preventing the co-extraction of Ni and Li. The Co and the Mn content in the strip solution increased with time and 98.4% recovery of Co was achieved while preventing the passage of Ni and Li into the strip solution. The separation and recovery of Co in stage 1 is presented in FIG. 10(a) to FIG. 10(e).

For further purification of Co from Mn, a stage-two separation was conducted using the final strip solution from the stage-one separation as the feed solution. The pH of the feed solution was adjusted to 1.2 using ammonium hydroxide. The composition of the feed solution for stage-two included Co (2853.6 ppm) and Mn (7844.3), with no Li or Ni detected. The decrease in the concentration of Co and Mn was due to the addition of ammonium hydroxide to the feed solution for pH adjustment. The extractant used in this stage was 1M Cyanex 301 in Isopar-L (50% v/v). The membrane module area was 1.4 $m^2$. The strip solution used was 1 L of 1M $H_2SO_4$. Cyanex 301 selectively extracts both Co and Ni while minimizing the co-extraction of Mn at a feed pH of less than 1.5. However, the concentration of Ni in the feed solution prepared from the strip solution of stage-one was nearly zero, indicating there was no extraction of Ni by the organic phase. Hence, stage-two was used to separate and recover Co from a solution of both Co and Mn. The Co content in the strip increased with time and 94.3% cumulative recovery of Co was achieved in four hours while preventing the passage of Mn into the strip solution. 100% pure Co was recovered from membrane solvent extraction using Cyanex as the extractant in organic phase contained in the membrane pores. Feed pH decreased to 1.13 during this experiment. However, the extraction rate of Co was not affected by this change in pH. The separation performance of stage-two is presented in FIG. 11(a) to FIG. 11(e).

To separate Ni and Li present in the stage-one feed solution, a third stage of separation was conducted using the same feed solution remaining after stage-one. The pH of the feed solution for stage-three was adjusted to 6.3 using ammonium hydroxide. The composition of the feed solution included Li (744.5 ppm) and Ni (3467.1 ppm), with no Co, Mn, or Al detected. The decrease in concentration of Ni and Li was due to the addition of ammonium hydroxide to the feed solution for pH adjustment. The extractant used in this stage was 1M Cyanex 272 in Isopar-L (50% v/v). The strip solution included 1 L 0.75M $H_2SO_4$. The membrane module area was 1.4 $m^2$. Cyanex 272 selective extracts Ni while minimizing the co-extraction of Li in the feed pH range of 6.0 to 6.5. The Ni content in the strip solution increased with time and 89.7% cumulative recover of Ni was achieved in six hours with a minimal transfer of Li into the strip solution. 96.1% pure Ni was recovered from membrane solvent extraction using Cyanex 272 as the extractant in organic phase contained in membrane pores. The feed pH value was maintained in the range of 6.0 to 6.5 during the test run. The separation performance of stage-three is presented in FIG. 12(a) to FIG. 12(e).

Figure 13:
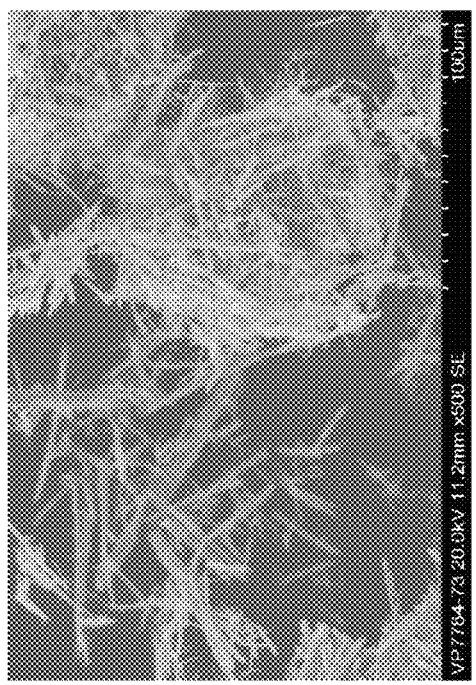
FIG. 13 includes scanning electron microscopy (SEM) images of cobalt oxide separated from cathode materials in Example 4.
Figure 13:
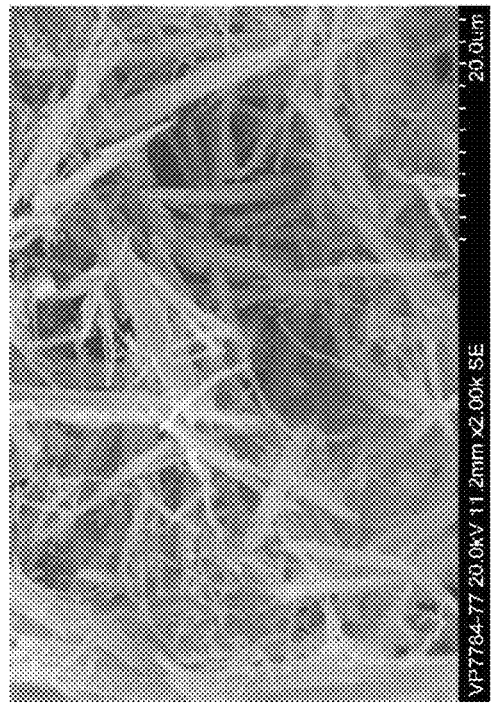
Figure 13:
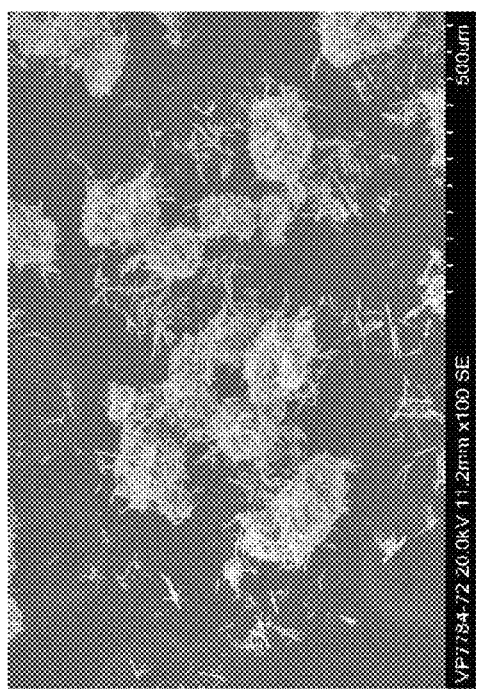
Figure 13:
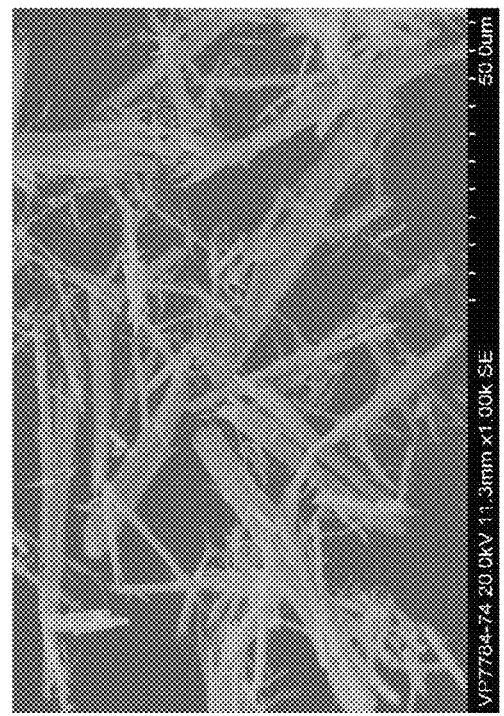
Figure 14:
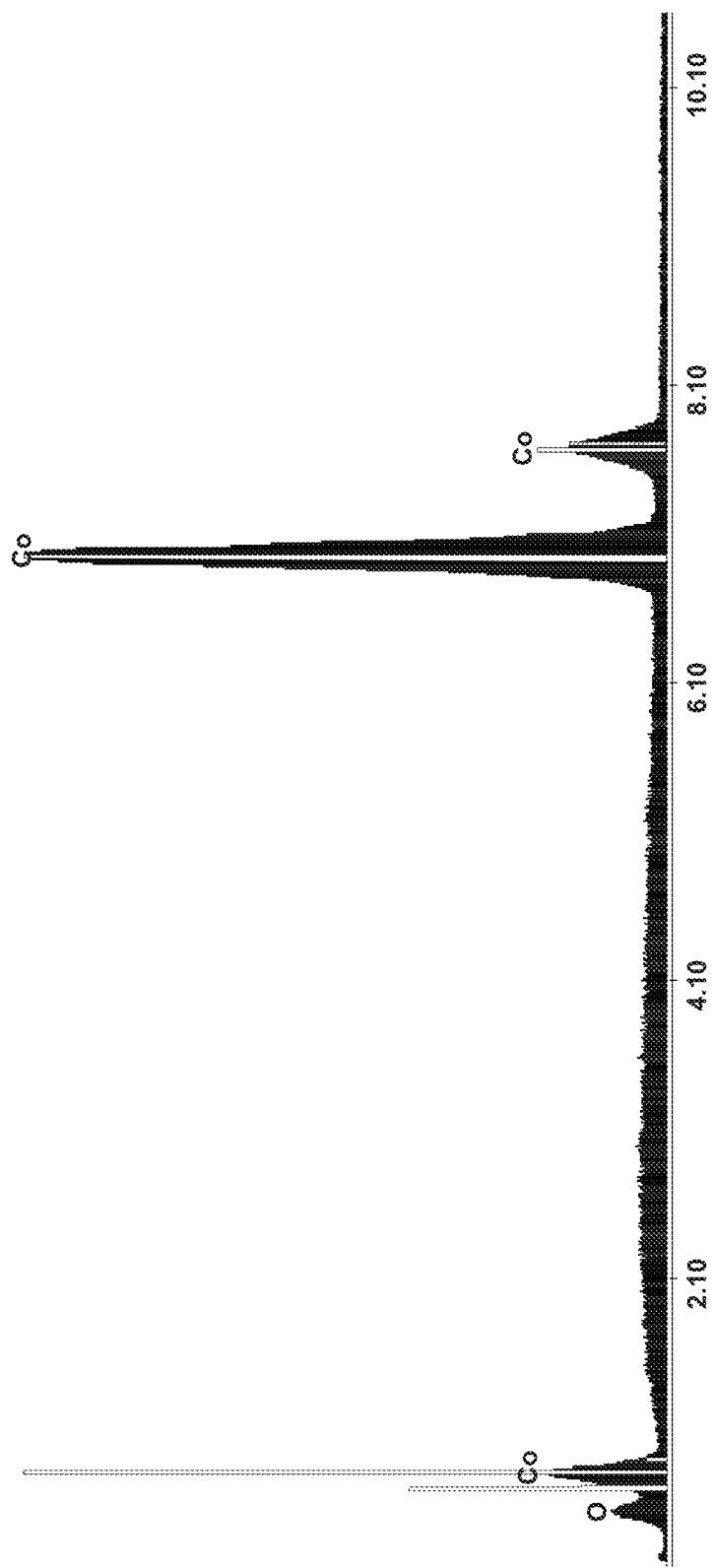
FIG. 14 includes the energy-dispersive x-ray spectroscopy (EDS) of cobalt oxide separated from cathode materials in Example 4.
Figure 15:
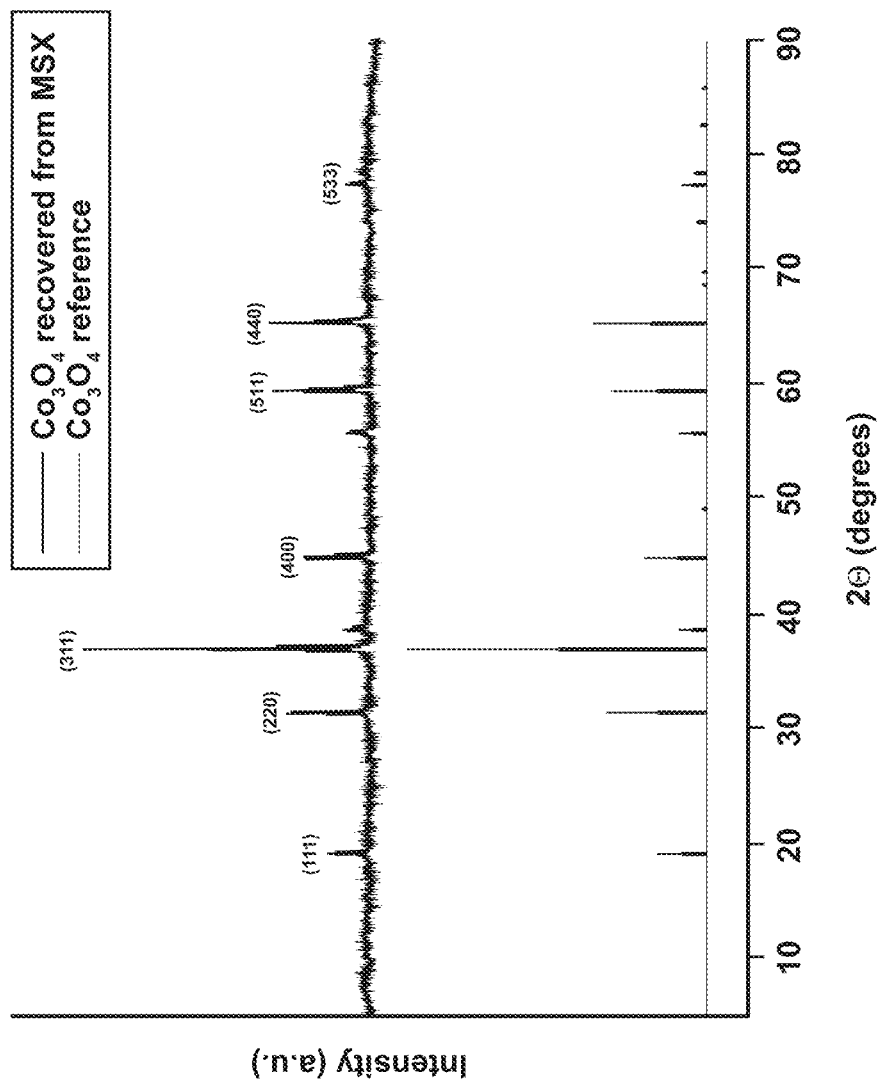
FIG. 15 includes the X-ray diffraction (XRD) of cobalt oxide separated from cathode materials in Example 4.

Recovered cobalt was precipitated using oxalic acid and annealed at 760° C. The cobalt oxide was then characterized using scanning electron microscopy (SEM) and energy-dispersive x-ray spectroscopy (EDS). FIG. 13 shows the SEM images of the $Co_3O_4$ powders. The $Co_3O_4$ powders contain rod-shaped particles that are 20-40 μm in size. The EDS spectrum of the $Co_3O_4$ recovered from cathode materials is shown in FIG. 14. The characteristic peaks for only $Co_3O_4$ were observed in the EDS spectrum. Other than cobalt, peaks for any other constituent element of the cathode materials were not observed, which strongly suggests that the cobalt separated from other constituent elements of a cathode material (Li, Ni, Mn) is in pure form. Lastly, FIG. 15 includes the X-ray diffraction (XRD) of $Co_3O_4$ separated from cathode materials.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for the recovery of cobalt from lithium ion batteries, the method comprising:
   dissolving a battery material containing Co, Mn, Ni, and Li within an acid to form a feed solution, the feed solution including Co and Li;
   providing a membrane module including a plurality of hollow fibers, the plurality of hollow fibers including a porous sidewall defining a lumen side spaced apart from a shell side;
   wetting the porous sidewall of the plurality of hollow fibers with an organic phase, the organic phase including a cationic extractant and an organic solvent, wherein the organic phase is free of tributyl phosphate;

performing membrane solvent extraction by moving the feed solution along one of the lumen side or the shell side of the plurality of hollow fibers and simultaneously moving a strip solution along the other of the lumen side or the shell side of the plurality of hollow fibers, the strip solution including a pH that is less than a pH of the aqueous feed solution;

maintaining a pH of the feed solution within a predetermined range of between 4.0 and 6.0, inclusive, by intermittently introducing a buffer or a base to the feed solution during membrane solvent extraction;

wherein wetting the porous sidewall of the plurality of hollow fibers with the organic phase is performed prior to moving the feed solution and moving the strip solution, and wherein the cationic extractant in the porous sidewall continuously extracts Co and Mn from the aqueous feed solution for recovery by the strip solution while substantially rejecting Li and Ni.

2. The method of claim 1 wherein the feed solution includes a positive pressure differential with respect to the strip solution of between 1 psi and 5 psi.

3. The method of claim 1 wherein the feed solution and the strip solution are moving in continuous recirculation through the membrane module for at least thirty minutes.

4. The method of claim 1 further including separating the battery material from a spent battery cathode, wherein separating the battery material from a spent battery cathode includes subjecting the spent battery cathode to a thermal treatment, acid dissolution, and vacuum filtration.

5. The method of claim 1, wherein the cationic extractant is a virgin cation extractant in hydrogen form.

6. A method for recycling battery material, the method comprising:

dissolving battery material containing Co, Mn, Li, and Ni within an acid to form a first feed solution and regulating the pH of the first feed solution between 4 and 6, inclusive;

providing a first membrane module including a first plurality of hollow fibers, the first plurality of hollow fibers each including a lumen side and a shell side;

wetting the first plurality of hollow fibers with a first organic phase, the first organic phase including a first cationic extractant and being free of tributyl phosphate; and after wetting the first plurality of hollow fibers, moving the aqueous feed solution along one of the lumen side or the shell side of the plurality of hollow fibers and simultaneously moving a strip solution along the other of the lumen side or the shell side of the plurality of hollow fibers;

wherein the first cationic extractant continuously removes Co and Mn from the aqueous feed solution as a first-stage membrane solvent extraction while substantially rejecting Li and Ni, and wherein the strip solution continuously back extracts Co and Mn from the first organic phase.

7. The method of claim 6 wherein regulating the pH of the first feed solution includes intermittently adding a buffer or a base to maintain the pH between 4 and 6, inclusive.

8. The method of claim 6 wherein the first feed solution includes a positive pressure differential with respect to the first strip solution of between 1 psi and 5 psi.

9. The method of claim 6 wherein moving the first feed solution and moving the first strip solution includes continuously recirculating the first feed solution and the first strip solution through the first membrane module for at least one hour.

10. The method of claim 6 wherein first plurality of hollow fibers are formed from a porous hydrophobic material.

11. The method of claim 6 further including separating the battery material from a spent battery cathode, wherein separating the battery material from a spent battery cathode includes subjecting the spent battery cathode to a thermal treatment, acid dissolution, and vacuum filtration.

12. The method of claim 6, wherein the first cationic extractant is a virgin cation extractant in hydrogen form.

13. A method for recycling battery material, the method comprising:

dissolving battery material containing Co, Mn, Li, and Ni within an acid to form a first feed solution and regulating the pH of the first feed solution between 4 and 6, inclusive;

providing a first membrane module including a first plurality of hollow fibers, the first plurality of hollow fibers each including a lumen side and a shell side;

wetting the first plurality of hollow fibers with a first organic phase, the first organic phase including a first cationic extractant; and after wetting the first plurality of hollow fibers, moving the aqueous feed solution along one of the lumen side or the shell side of the plurality of hollow fibers and simultaneously moving a strip solution along the other of the lumen side or the shell side of the plurality of hollow fibers;

wherein the first cationic extractant continuously removes Co and Mn from the aqueous feed solution as a first-stage membrane solvent extraction while substantially rejecting Li and Ni, and wherein the strip solution continuously back extracts Co and Mn from the first organic phase;

further including performing a second-stage membrane solvent extraction of the first strip solution, as a second feed solution, to recover Co while substantially rejecting Mn, and regulating the pH of the second feed solution to be less than or equal to 1.5.

14. The method of claim 13 wherein the second-stage membrane solvent extraction includes:

providing a second membrane module including a second plurality of hollow fibers, the second plurality of hollow fibers including a lumen side and a shell side;

wetting the second plurality of hollow fibers with a second organic phase, the second organic phase including a second cationic extractant; and moving the second feed solution along one of the lumen side or the shell side of the second plurality of hollow fibers and simultaneously moving a second strip solution along the other of the lumen side or the shell side of the second plurality of hollow fibers;

wherein the second cationic extractant continuously extracts Co from the second feed solution while substantially rejecting Mn, and wherein the third strip solution continuously back extracts Co from the second organic phase.

15. The method of claim 13 further including performing a third-stage membrane solvent extraction of the first solution, as a third feed solution, to recover Ni while substantially rejecting Li, and regulating the pH of the third feed solution to be between 6.0 and 6.5, inclusive.

16. The method of claim 15 wherein the third-stage membrane solvent extraction includes:

providing a third membrane module including a third plurality of hollow fibers, the third plurality of hollow fibers including a lumen side and a shell side;

wetting the third plurality of hollow fibers with a third organic phase, the third organic phase including a third cationic extractant; and moving the third feed solution along one of the lumen side or the shell side of the third plurality of hollow fibers and simultaneously moving a third strip solution along the other of the lumen side or the shell side of the third plurality of hollow fibers;

wherein the third cationic extractant continuously extracts Ni from the third feed solution while substantially rejecting Li, and wherein the third strip solution continuously back extracts Ni from the third organic phase.

* * * * *